(12) United States Patent
Hu et al.

(10) Patent No.: US 11,654,793 B2
(45) Date of Patent: May 23, 2023

(54) CELL CAPACITY BASED BATTERY PACK BALANCING

(71) Applicant: Ford Global Technologies, LLC, Dearborn, MI (US)

(72) Inventors: Rui Hu, Windsor (CA); Rui Wang, Canton, MI (US); Xu Wang, Northville, MI (US); Baojin Wang, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 259 days.

(21) Appl. No.: 16/952,671

(22) Filed: Nov. 19, 2020

(65) Prior Publication Data

US 2022/0153168 A1 May 19, 2022

(51) Int. Cl.
*H02J 7/00* (2006.01)
*B60L 58/22* (2019.01)
*H01M 10/42* (2006.01)
*H01M 10/44* (2006.01)

(52) U.S. Cl.
CPC ........... *B60L 58/22* (2019.02); *H01M 10/425* (2013.01); *H01M 10/441* (2013.01); *H01M 2010/4271* (2013.01)

(58) Field of Classification Search
USPC ................................ 320/134, 135, 136, 137
See application file for complete search history.

(56) References Cited

U.S. PATENT DOCUMENTS

2013/0030617 A1* 1/2013 Blakemore ......... H02J 7/00716
 701/22
2014/0152266 A1* 6/2014 Cheon ................. H01M 10/446
 320/134

FOREIGN PATENT DOCUMENTS

DE 102015100152 A1 * 7/2015 .............. B60K 6/00
DE 102019108579 A1 * 10/2020
GB 2550954 A 12/2017

* cited by examiner

*Primary Examiner* — Brian Ngo
(74) *Attorney, Agent, or Firm* — David B. Kelley; Brooks Kushman P.C.

(57) ABSTRACT

A vehicle includes a traction battery and a controller. The controller, responsive to some cells of the traction battery achieving a first state of charge threshold, discharge other cells of the traction battery, each having a capacity greater than each of the some of the cells, to a second state of charge threshold that is greater than the first state of charge threshold without discharging the some of the cells. The controller then charges all of the cells at the same time such that the some of the cells and the other of the cells achieve a same predetermined target state of charge at a same time.

6 Claims, 5 Drawing Sheets

CELL CAPACITY BASED BATTERY PACK BALANCING

TECHNICAL FIELD

This disclosure relates to vehicle battery pack cell balancing strategies.

BACKGROUND

Certain vehicles may include battery packs that provide power to electric machines for propulsion. These packs often include a number of cells. Due to a variety of circumstances and conditions, the cells may have different states of charge.

Cell balancing is performed to reduce cell-to-cell differences in state of charge. In some arrangements, each cell of a pack may be outfitted with a resistor or the like to individually discharge the cell. Once the cell having the lowest state of charge achieves a lower limit value during normal operation, the other cells may be individually discharged to the lower limit value, and then all of the cells may be recharged.

SUMMARY

A vehicle includes a traction battery and a controller. The controller, responsive to some of the cells of the traction battery achieving a first state of charge threshold, discharges other of the cells of the traction battery, each having a capacity greater than each of the some of the cells, to a second state of charge threshold that is greater than the first state of charge threshold without discharging the some of the cells, and then charges all of the cells at the same time such that the some of the cells and the other of the cells achieve a predetermined target state of charge at a same time.

A method for balancing cells of a traction battery includes, responsive to some of the cells achieving a first state of charge threshold, discharging other of the cells, each having a capacity greater than each of the some of the cells, to a second state of charge threshold that is greater than the first state of charge threshold without discharging the some of the cells, and then charging all of the cells at the same time such that the some of the cells and the other of the cells achieve a same predetermined target state of charge at a same time.

A vehicle includes a traction battery and a controller. The controller, responsive to some of the cells achieving a first state of charge threshold and other of the cells having states of charge greater than the first state of charge threshold but less than a second state of charge threshold, discharges the some of the cells to a third state of charge threshold that is less than the first state of charge threshold without discharging the other of the cells, and then charges all of the cells at the same time such that the some of the cells and the other of the cells achieve a same predetermined target state of charge at a same time.

DETAILED DESCRIPTION

Embodiments are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one of ordinary skill in the art. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Battery cell capacity corresponds to the quantity of electric charge that can be accumulated during charge, stored during open circuit stay, and released during discharge in a reversible manner. It can be obtained on a cell-by-cell basis in known fashion by integration of discharge current starting from a completely charged cell and terminating the discharge process at a certain cutoff voltage threshold.

Battery cell capacity is typically measured in amp-hours. For example, if a cell has a 2 amp·hours capacity and provides 1 amp average current to a load, the battery will theoretically last 2 hours. The way the cell is discharged, however, has an impact on the actual cell life. Discharging a cell at the manufacturer-recommended rate normally helps the cell achieve its nominal capacity.

Figure 1:
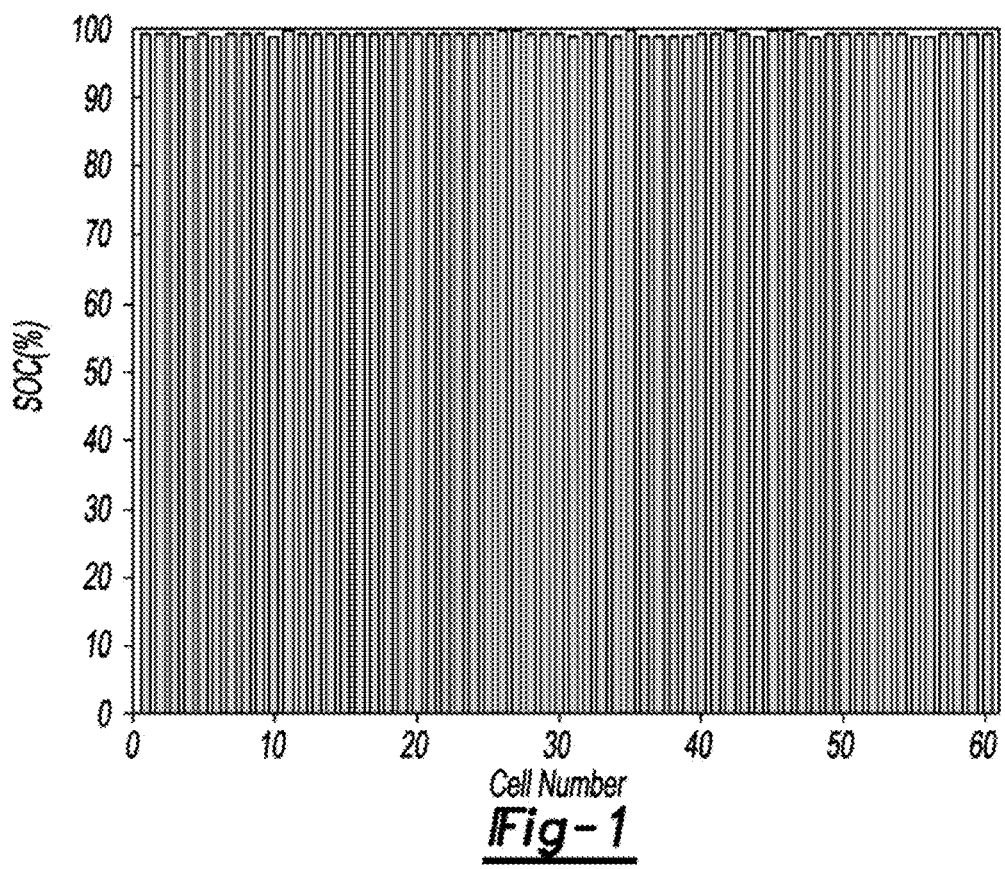
FIGS. 1 through 7 are bar charts of states of charge for a plurality of cells of a battery pack.
Figure 2:
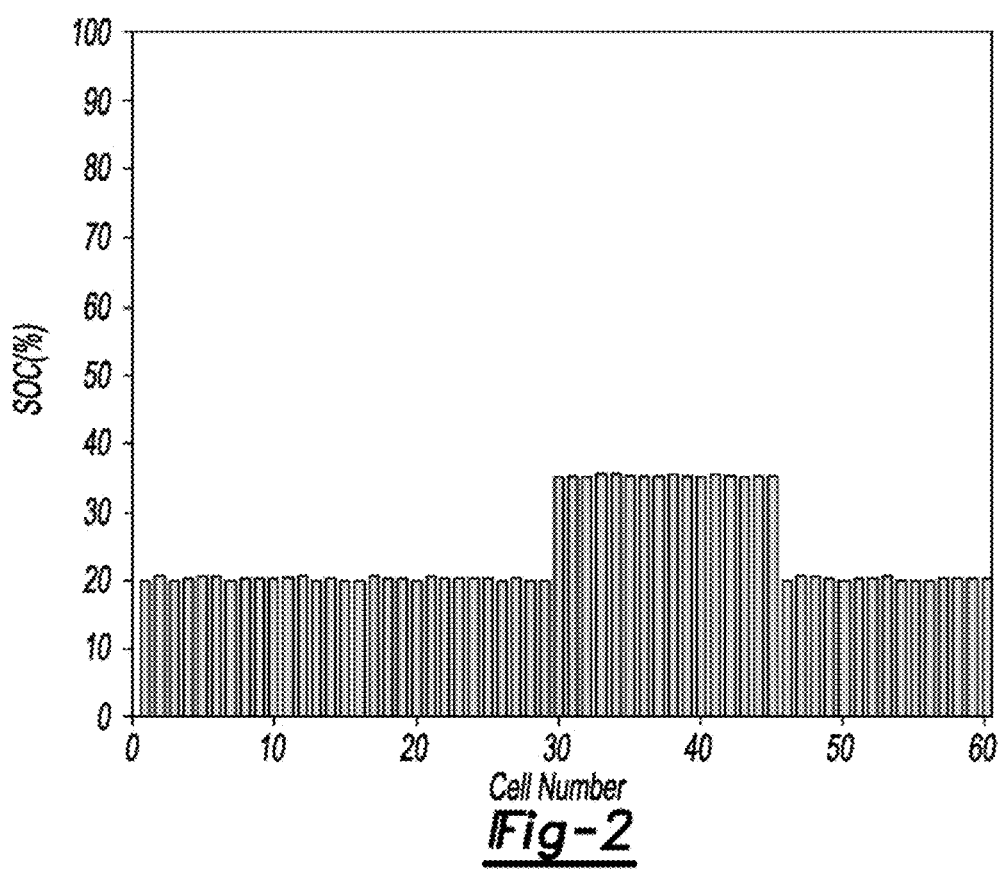
Figure 3:
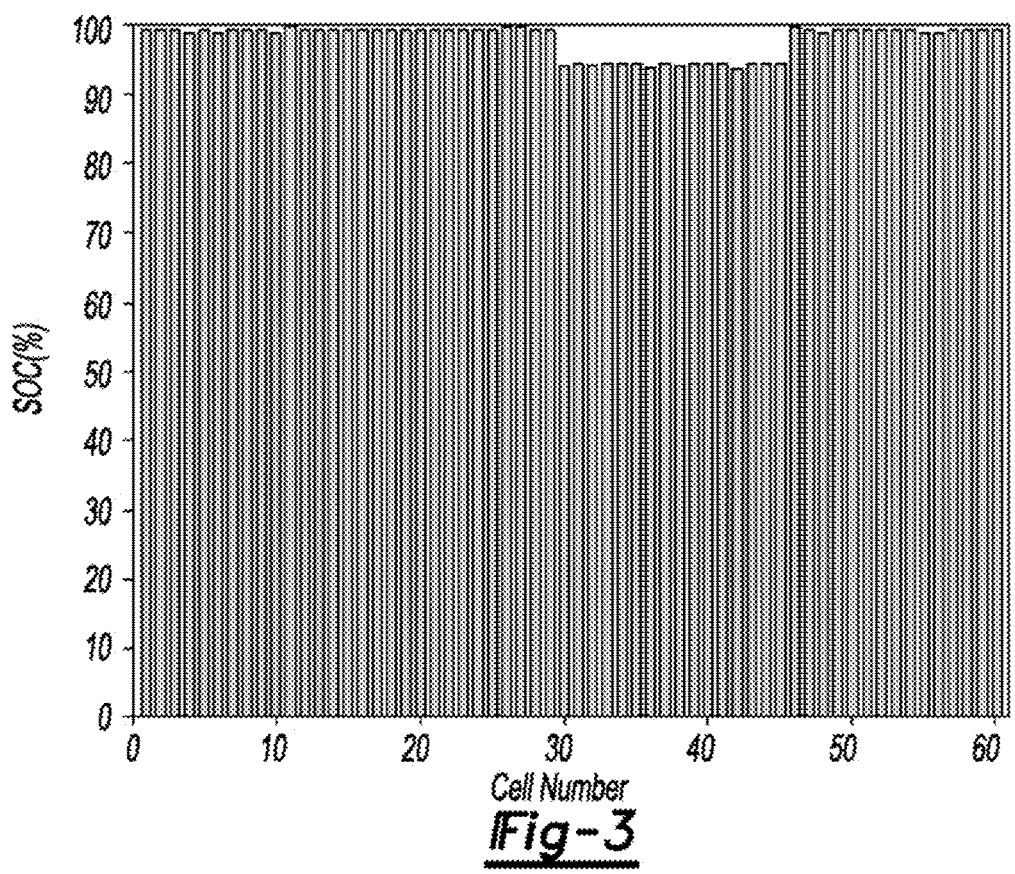
Figure 4:
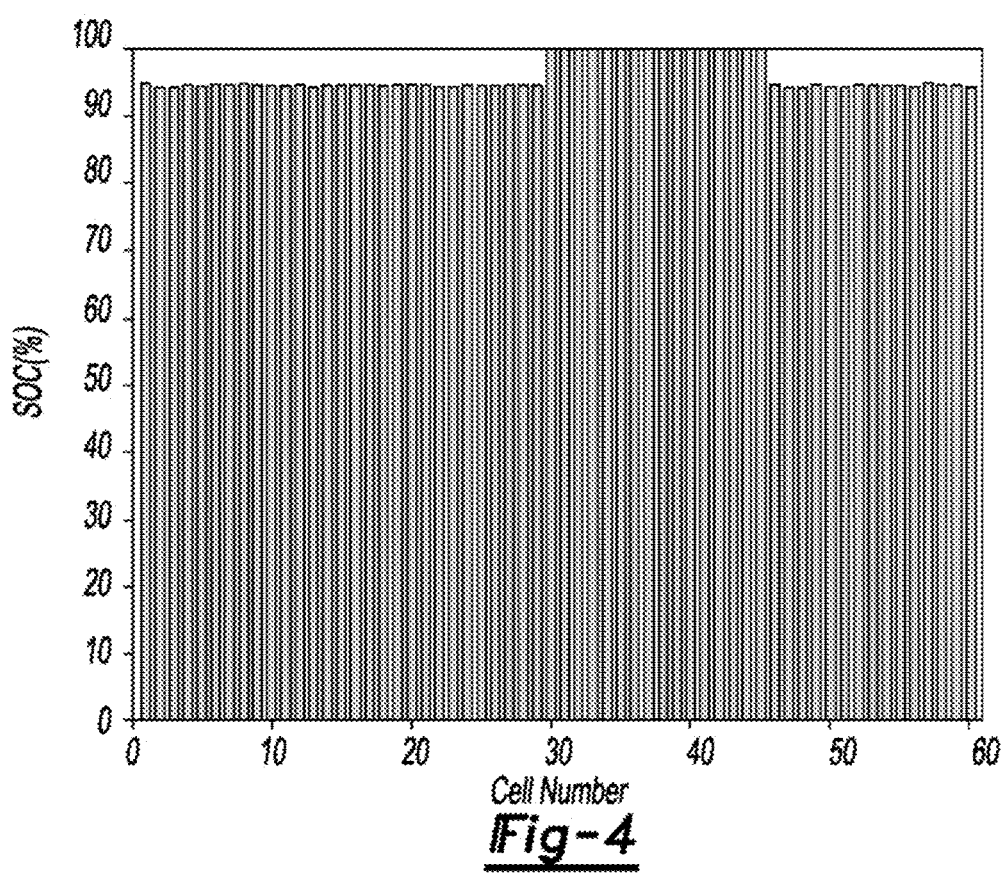

When all cells of a battery pack are new, they likely have the same or very similar capacities. As the cells age however, their capacity may decrease. If some of the cells are replaced, the newer cells may have greater capacity than the older cells. This situation is illustrated with reference to FIGS. 1 and 2. FIG. 1 shows that approximately 60 cells of a battery pack can have a same state of charge (e.g., 100%) when fully charged. For purposes of discussion, it is assumed that cells 30 through 45 have been replaced and are therefore "new." FIG. 2 shows that after discharge cells 30 through 45 have greater state of charge than the other "old" cells. This is due to the new cells having greater capacity. By analogy, cell capacity can be thought of as container size. When all cells are new, they all have the same container size. As the cells age, their container size shrinks. When some of the cells are subsequently replaced, the "new" cells will have larger container size relative to the "old" cells. Thus, for a given amount of discharge (or charge), the "old" cells will empty (or fill) faster. With reference to FIG. 3, if cells 30 through 45 are individually discharged to 20% state of charge (the lower limit value in this example), and then all the cells are charged, the "old" cells may achieve 100% state of charge prior to the "new" cells. With reference to FIG. 4, if cells 30 through 45 are not individually discharged to 20% state of charge, but instead all the cells are charged, the "new" cells may achieve 100% state of charge prior to the "old" cells-depending on the difference between the states of charge of the "new" and "old" cells when charging is initiated.

The example of FIGS. 2 and 3 shows that discharging the "new" cells to the 20% lower limit value wastes energy, and charging the "old" and "new" cells having same initial state of charge does not eliminate imbalances between the "old" and "new" cells. The example of FIGS. 2 and 4 shows that recharging "old" cells with an initial state of charge of 20% and "new" cells with an initial state of charge of 35% does not necessarily eliminate imbalances between the "old" and "new" cells. There may, however, be a difference in initial states of charge between the "old" and "new" cells that results in all cells achieving 100% state of charge when charged at the same time.

Equation (1) establishes, for a given initial state of charge of the "old" cells ($SOC_{old}$), an initial state of charge ($SOC_{new}$) for the "new" cells at which the state of charge of all the cells would achieve 100% if charged at the same time.

$$SOC_{new} = 100\% - (100\% - SOC_{old}) \times \frac{CAP_{old}}{CAP_{new}} \quad (1)$$

where $CAP_{old}$ is the average capacity of the "old" cells and $CAP_{new}$ is the average capacity of the "new" cells, which can be determined using known techniques.

Equation (2) defines the difference, $\Delta SOC$, between the target lower limit values for the "new" and "old" cells:

$$\Delta SOC = SOC_{new} - SOC_{old} = \left(\frac{CAP_{new} - CAP_{old}}{CAP_{new}}\right)(100\% - SOC_{old}) \quad (2)$$

That is, if the difference in initial SOCs between the "new" and "old" cells is equal to $\Delta SOC$ when charging it initiated for all the cells, the "new" and "old" cells will achieve 100% state of charge at the same time-thus achieving a balanced pack. In this example, 100% is used as the target value for balancing. Other percentages, 85%, 70%, etc., however, can also be used as the target.

Figure 5:
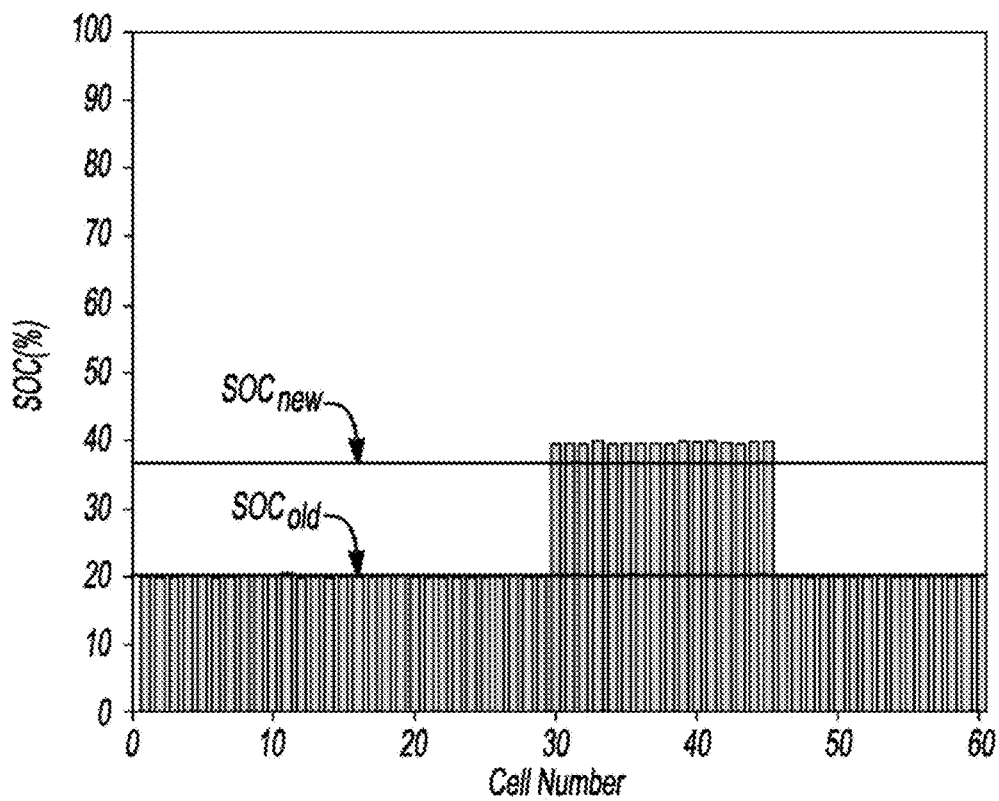
Figure 6:
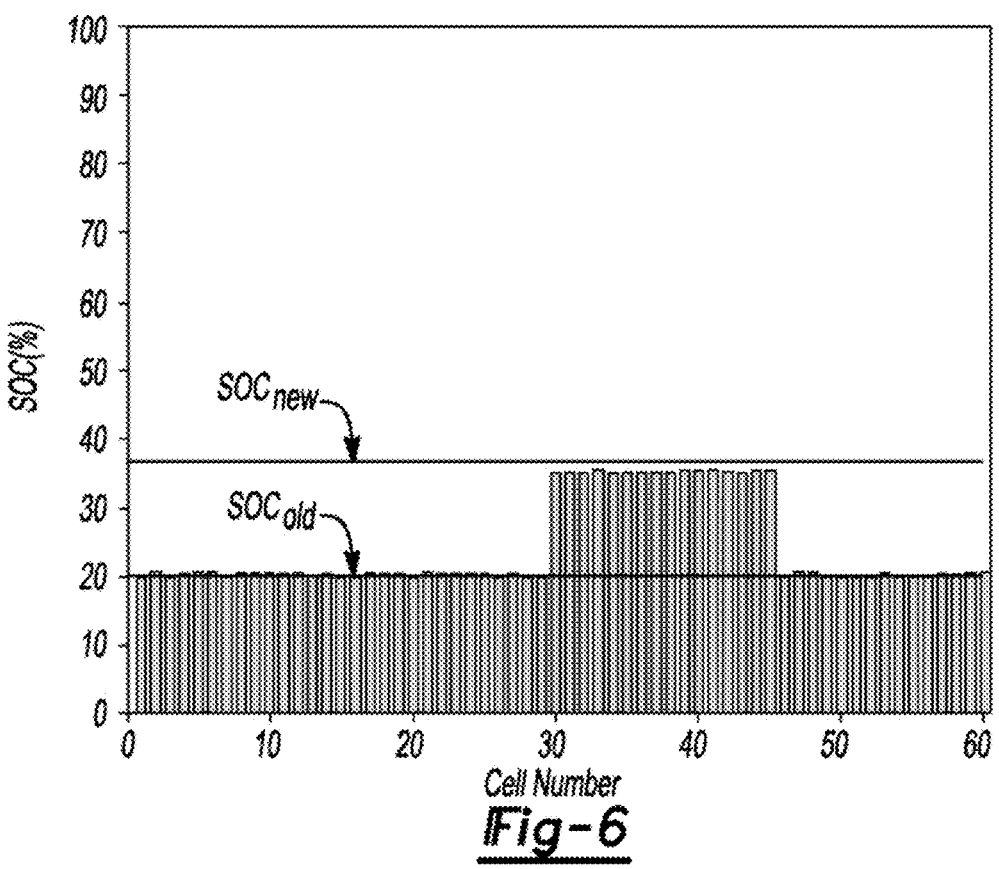

FIGS. 5 and 6 show two possible scenarios in which $SOC_{new}$ is established to be 37% according to Equation (1) given an $SOC_{new}$ of approximately 20%, and values for $CAP_{old}$ and $CAP_{new}$ that were determined using known techniques. In FIG. 5, the actual state of charge of the "new" cells is greater than $SOC_{new}$ and the actual state of charge of the "old" cells happens to be equal to $SOC_{old}$. Here, $SOC_{new}$ was calculated responsive to the actual state of charge of the "old" cells achieving $SOC_{old}$. As explained above, if all the cells were simply recharged at the same time, the "new" and "old" cells would not achieve 100% state of charge at the same time. To remedy this situation, the "new" cells can be individually discharged such that their states of charge become equal to $SOC_{new}$. Then, all the cells can be recharged at the same time. Because the difference in the actual initial states of charge for the "new" and "old" cells adhere to the conditions of Equation (2), the "new" and "old" cells would achieve 100% state of charge at the same time, resulting in a balanced pack.

In FIG. 6, the actual state of charge of the "new" cells is less than $SOC_{new}$ and the actual state of charge of the "old" cells happens to be equal to $SOC_{old}$. Again, if all the cells were simply recharged at the same time, the "new" and "old" cells would not achieve 100% state of charge at the same time. To remedy this situation, the "old" cells can be individually discharged such that their states of charge become equal to an updated $SOC_{old}$ ($SOC_{old\_revised}$).

To obtain $SOC_{old\_revised}$, $SOC_{new}$ is first calculated. $SOC_{old}$ in this circumstance can be that target state of charge threshold for the pack that is set at the factory to trigger a rebalancing operation, and $CAP_{old}$ and $CAP_{new}$ can be determined using known techniques. Once $SOC_{new}$ is established via Equation (1) and it is determined that the actual state of charge of the "new" cells is less than $SOC_{new}$ (but greater than $SOC_{old}$), Equation (3), which is Equation (1) rearranged, can be used to calculate $SOC_{old\_revised}$:

$$SOC_{old\_revised} = 100\% + (SOC_{actual\_new} - 100\%) \times \frac{CAP_{new}}{CAP_{old}} \quad (3)$$

where $SOC_{actual\_new}$ is the actual state of charge of the new cells.

Figure 7:
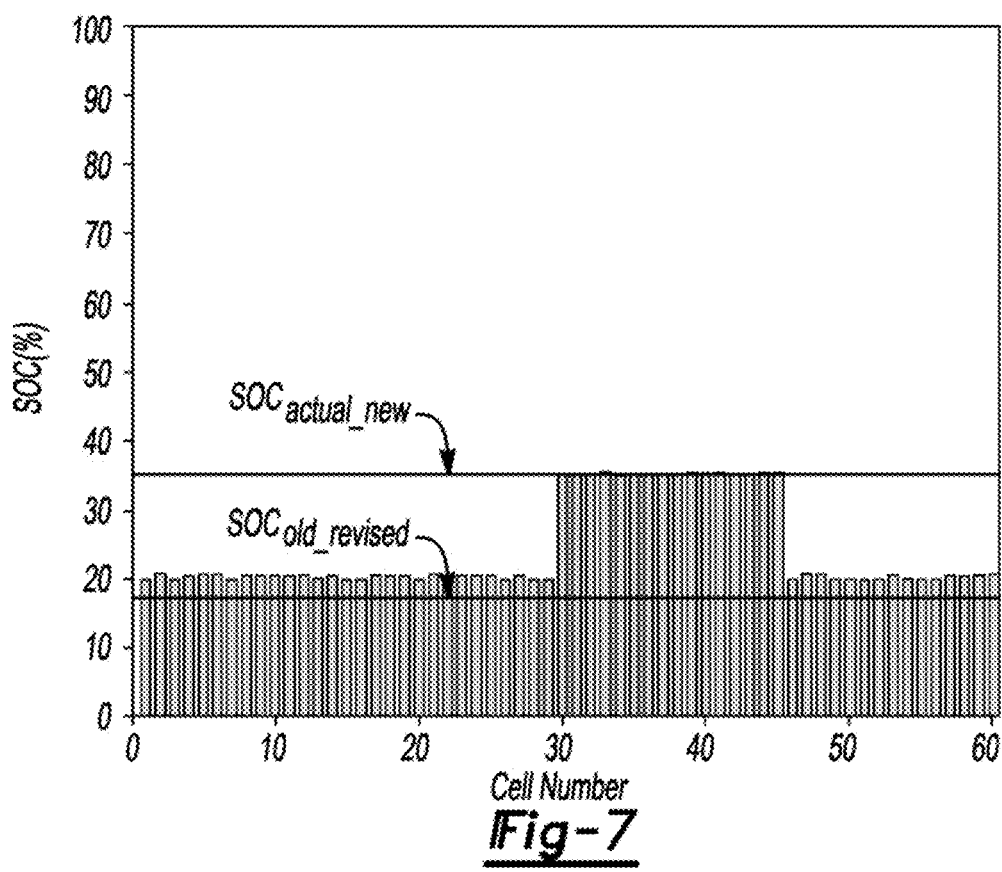

FIG. 7 shows the thresholds $SOC_{actual\_new}$ and $SOC_{old\_revised}$ relative to the actual states of charge of the "new" and "old" cells. The "old" cells can be individually discharged such that their states of charge become equal to $SOC_{old\_revised}$. All the cells can then be charged. Because the difference between $SOC_{actual\_new}$ and $SOC_{old\_revised}$ adheres to the conditions of Equation (2), the "new" and "old" cells would achieve 100% state of charge at the same time, resulting in a balanced pack Discharging the "old" cells may result in reduced vehicle range. As such, the operations described with reference to FIG. 7 may be performed only when the vehicle is plugged in for charging.

Figure 8:
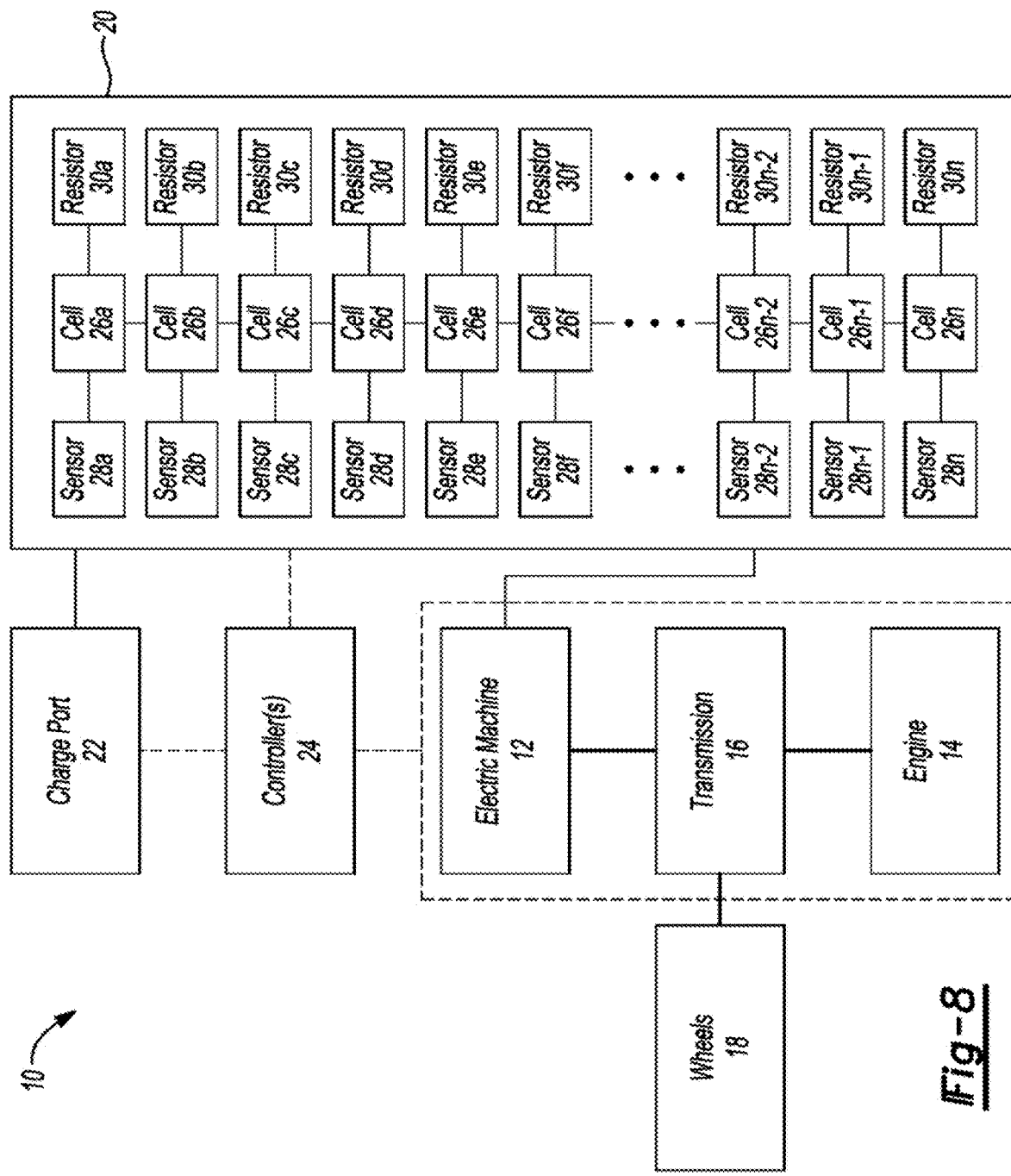
FIG. 8 is a block diagram of portions of a vehicle.

FIG. 8 shows an example vehicle 10. The vehicle 10 includes an electric machine 12, an engine 14, a transmission 16, and wheels 18. The vehicle 10 further includes a traction battery pack 20, a charge port 22, and one or more controllers 24. The electric machine 12 may convert electric power from the traction battery 20 to mechanical power to drive the transmission 16. Likewise, the engine 14 may generate mechanical power to driver the transmission 16. The electric machine 12 and engine 14 may operate at the same time or individually to drive the transmission 16. The transmission 16 transfers the mechanical power to the wheels 18 to propel the vehicle 10. Other powertrain arrangements are also possible. An engine, electric machine, and transmission, for example, may be arranged in series, etc.

The traction battery pack 20 includes a plurality of battery cells 26a-26n, a plurality of sensors 28a-28n, and a plurality of resistors 30a-30n. The sensors 28a-28n may measure voltage, current, etc. from which state of charge, capacity, etc. can be derived in known fashion. For example, cell voltage may be proportional to state of charge such that a cell voltage of 4.3 volts may correspond to 100% state of charge and a cell voltage of 3.1 voltage may correspond to 20% state of charge. The resistors 30a-30n may be used to individually discharge the corresponding cells to reduce their states of charge.

The charge port 22 may receive electric power from a charge cable and remote charger, and transfer such power to the cells 26a-26n.

The one or more controllers 24 are in communication with, and exert control over, the electric machine 12, engine 14, and transmission 16, the traction battery 20, and the charge port 22. Upon determining the state of charge of each of the cells 26a-26n, the one or more controllers 22 may group them into separate categories (e.g., "old" and "new," "first" and "second," "lower" and "higher," etc.). After a routine discharge cycle, those with lower states of charge (e.g., those cells within ±5% of 20% could be deemed "old" and those with higher states of charge (e.g., those cells greater than 25%) could be deemed "new." The one or more controllers 24 may then implement the algorithms described above with reference to FIGS. 5-7 to balance the cells 26a-26n.

Representative control strategies and/or logic are described that may be implemented using one or more processing strategies such as event-driven, interrupt-driven, multi-tasking, multi-threading, state-driven, and the like. As such, various steps or functions illustrated may be performed in the sequence described, in parallel, or in some cases omitted. Although not always explicitly illustrated, one of ordinary skill in the art will recognize that one or more of the contemplated steps or functions may be repeatedly performed depending upon the particular processing strategy being used. Similarly, the order of processing is not necessarily required to achieve the features and advantages described herein, but is provided for ease of illustration and description.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. To achieve a same state of charge for example, cells of course need not have exactly the same state of charge. States of charge within a few percentage points of each other can be deemed to be same, etc.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
a traction battery including a plurality of cells; and
a controller programmed to,
responsive to some of the cells achieving a first state of charge threshold, discharge other of the cells, each having a capacity greater than each of the some of the cells, to a second state of charge threshold that is greater than the first state of charge threshold without discharging the some of the cells, and then charge all of the cells at a same time such that the some of the cells and the other of the cells achieve a same predetermined target state of charge at a same time, and
responsive to the some of the cells achieving the first state of charge threshold, the other of the cells having states of charge greater than the first state of charge threshold but less than the second state of charge threshold, and the vehicle not be being plugged in, charge all of the cells at the same time.

2. The vehicle of claim 1, wherein the second state of charge threshold is proportional to a quotient of a capacity of the some of the cells and the capacity of the other of the cells.

3. The vehicle of claim 1, wherein a difference between the second and first state of charge thresholds is proportional to a quotient of (i) a difference between the capacity of the other of the cells and a capacity of the some of the cells and (ii) the capacity of the other of the cells.

4. The vehicle of claim 1, wherein the controller is further programmed to, responsive to the some of the cells achieving the first state of charge threshold and the other of the cells having states of charge greater than the first state of charge threshold but less than the second state of charge threshold, discharge the some of the cells to a third state of charge threshold that is less than the first state of charge threshold without discharging the other of the cells, and then charge all of the cells at the same time such that the some of the cells and the other of the cells achieve the predetermined target state of charge at the same time.

5. The vehicle of claim 4, wherein the third state of charge threshold is proportional to a quotient of the capacity of the other of the cells and a capacity of the some of the cells.

6. The vehicle of claim 1, wherein the controller is further programmed to, responsive to the some of the cells achieving the first state of charge threshold, the other of the cells having states of charge greater than the first state of charge threshold but less than the second state of charge threshold, and the vehicle being plugged in, discharge the some of the cells to a third state of charge threshold that is less than the first state of charge threshold without discharging the other of the cells, and then charge all of the cells at the same time such that the some of the cells and the other of the cells achieve the predetermined target state of charge at the same time.

* * * * *